V. A. FYNN.
SPEED REGULATING APPARATUS.
APPLICATION FILED MAY 27, 1918.

1,350,447.

Patented Aug. 24, 1920.

WITNESS.
Charles A. Becker

INVENTOR.
Valère A. Fynn
BY
E. E. Huffman
ATTORNEY.

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-REGULATING APPARATUS

1,350,447.     Specification of Letters Patent.     Patented Aug. 24, 1920.

Application filed May 27, 1918. Serial No. 236,822.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings, forming part of this specification.

My invention relates to means for regulating or adjusting the speed of prime movers, such as internal combustion engines.

Figure 1:
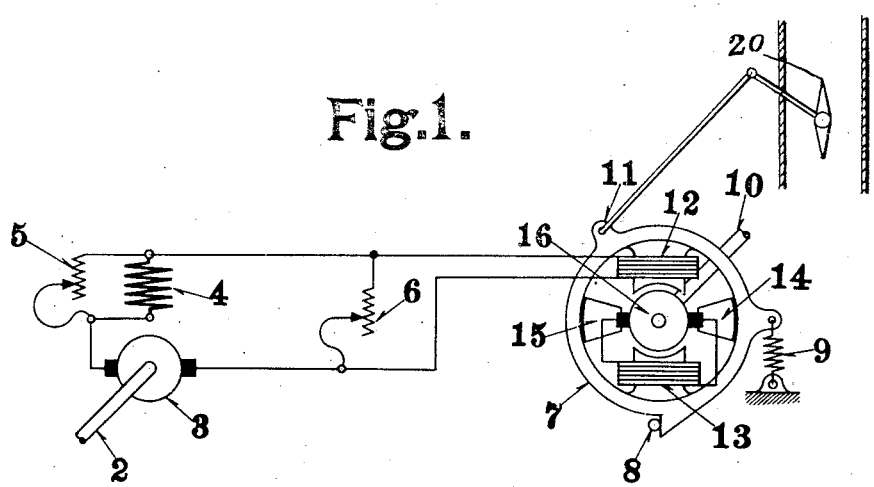

In carrying out my invention, I make use of a dynamo electric machine, having two movable members, one of which is mechanically connected to the throttle, while the other is driven from the engine shaft, together with external means for producing a magnetization in one of the members, for instance in that member which is connected to the throttle, and means for closing the circuit of the other, for instance the engine driven member, so that an E. M. F. produced in the last mentioned member, owing to its rotation in the magnetization produced by the external source, may cause a large current to circulate in the engine driven member. Figure 1 illustrates one embodiment of my invention and Fig. 2 a modification.

The embodiment of the invention illustrated in Fig. 1 comprises a series generator with the armature 3, and the field winding 4. The armature mounted on the shaft 2 is driven by the prime mover. The adjustable resistance 5 is connected in parallel to the exciting winding 4. Included in the circuit of the series generator is an exciting coil 12, located on the movable field structure 7, normally held against the stop 8 by the spring 9 and connected to the engine throttle 20 at the point 11. The current through the coil 12 can be regulated by means of the adjustable resistance 6 connected in parallel therewith. The armature 16, which coöperates with the movable field structure 7 is mounted on the shaft 10 and is driven from the engine. This armature carries an ordinary commuted winding, with which coöperate brushes held by supports 14, 15 which are insulatingly attached to the field structure 7. These brushes are connected to the coil 13 also located on the field structure 7.

Figure 2:
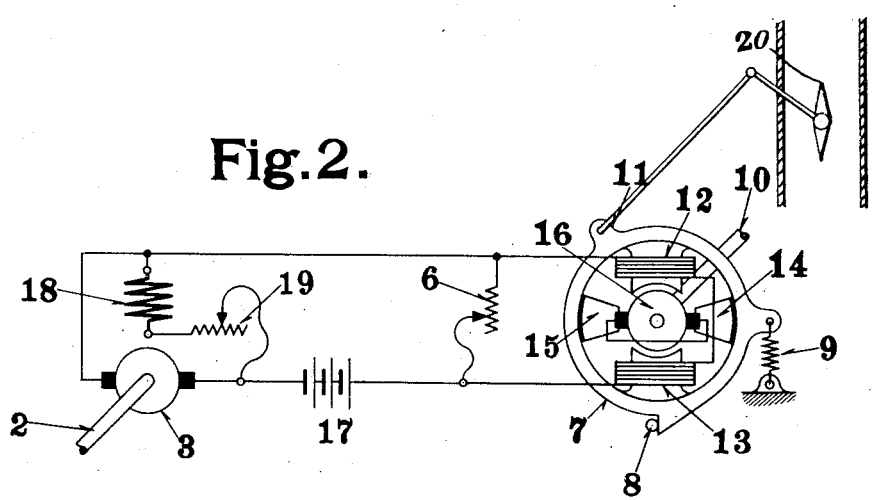

In Fig. 2, the armature 3 of the shunt wound generator is mounted on the shaft 2 and is driven by the prime mover. The shunt winding 18 is connected to the armature brushes by way of the adjustable resistance 19 and the external circuit of this generator comprises the storage battery 17 connected in series with the exciting coils 13 and 12 located on the movable field structure 7. An adjustable resistance 6 is connected in parallel to the two field coils 12 and 13. The movable field structure 7 is held against the stop 8 by the spring 9 and is connected to the throttle valve 20 at the point 11. The armature 16 coöperates with the field structure 7 and is mounted on the shaft 10 driven from the engine. This armature is provided with a commuted winding, with which coöperate brushes held in position by the supports 14 and 15 which are insulatingly carried by the field structure 7. These brushes are directly short-circuited.

In operating the arrangement shown in Fig. 1, the connection between the point 11 of the field structure 7 is so made that when 7 rests against the stop 8, as shown, the throttle is wide open. Assuming the engine to be running at full load, thus necessitating a wide open throttle, the adjustments at the resistances 5 and 6 are so made that the current produced by the generator 3 is just sufficient to cause such a current to flow in the armature 16 and in the field winding 13 that the torque exerted by the counterclockwise revolving armature on the field structure 7 balances the effort of the spring 9 without, however, causing the structure 7 to leave the stop 8. Should the load now be reduced, then the engine speed will immediately increase, with the result that the magnetization produced by the coil 12 and the speed of the armature 16 will increase. Both of these reasons will increase the torque exerted on the field structure 7, which will move away from the stop 8 and reduce the throttle opening, thus reducing the speed of the engine.

Instead of connecting the brushes coöperating with the armature 16 to an exciting coil located on the coöperating field structure, these brushes can be short circuited as shown in Fig. 2 and both exciting coils 12 and 13 can be placed in circuit with the series generator 3, 4. It is not necessary to locate the brushes so as to place the current axis of the armature at right angles to the magnetization produced by the field structure 7. These brushes may be so placed as to cause part of the armature ampere turns to help or oppose the magnetization produced from the field structure. Nor is it necessary to support the brushes from the field structure 7. If the angular movement of said structure is not excessive, then the brushes can be held stationary.

The operation of the arrangement shown in Fig. 2 is quite similar, except that the connections are so made that the E. M. F. generated by the dynamo 3, 18 equals and opposes, the E. M. F. of the storage battery 17 at or near the speed at which the engine is to run. As soon as the engine speed increases, the generator 3 sends a rapidly increasing charging current into the battery 17; this current produces a magnetization in the field structure 7, which immediately causes a very large current to be generated in the armature 16 which current is still further increased because of the increase in the speed of the armature 16. The result is that a powerful torque is at once exerted on the field structure 7 and in the direction in which the armature 16 revolves. In this case, as in the previous one, the throttle is normally held open and the torque of the field structure 7 is utilized to reduce the throttle opening with increasing engine speed.

Having fully described my invention, what I claim as new and desire to secure by Letters Patent of the United States is:

1. In speed regulating apparatus, the combination with a device to be regulated, of speed controlling means therefor, a dynamo electric machine having both members movable, one member being driven at a speed proportional to that of the device to be regulated and the other member being connected to the speed controlling means, and means independent of the dynamo electric machine for varying the excitation of said dynamo electric machine in response to variations in speed of the device to be regulated.

2. In speed regulating apparatus, the combination with a device to be regulated, of speed controlling means therefor, a dynamo electric machine having both members movable, one member being driven at a speed proportional to that of the device to be regulated and the other member being connected to the speed controlling means, a generator driven by the device to be regulated and supplying exciting current to the dynamo electric machine.

3. In speed regulating apparatus, the combination with a device to be regulated, of speed controlling means therefor, a dynamo electric machine having both members movable, one member being driven at a speed proportional to that of the device to be regulated and the other member being connected to the speed controlling means, means for short circuiting one member of said dynamo electric machine, and means for separately exciting the other member.

4. In speed regulating apparatus for prime movers, the combination with speed controlling means therefor, of a dynamo electric machine having both members movable, one member being driven at a speed proportional to that of the prime mover and the other member being connected to the speed controlling means, means for short circuiting one member of said dynamo electric machine, a generator driven by the prime mover, and a storage battery, said generator and battery being connected in opposition and in series circuit with the other member of the dynamo electric machine.

5. In speed regulating apparatus, the combination with a device to be regulated, of speed controlling means therefor, a dynamo electric machine for operating the speed controlling means, external means for varying the excitation of said dynamo electric machine in response to variations in engine speed, and means for varying the armature ampere turns of the dynamo electric machine in response to variations in excitation and variations in engine speed.

In testimony whereof, I have hereunto set my hand and affixed my seal.

VALÈRE A. FYNN. [L. S.]